Figure 1:
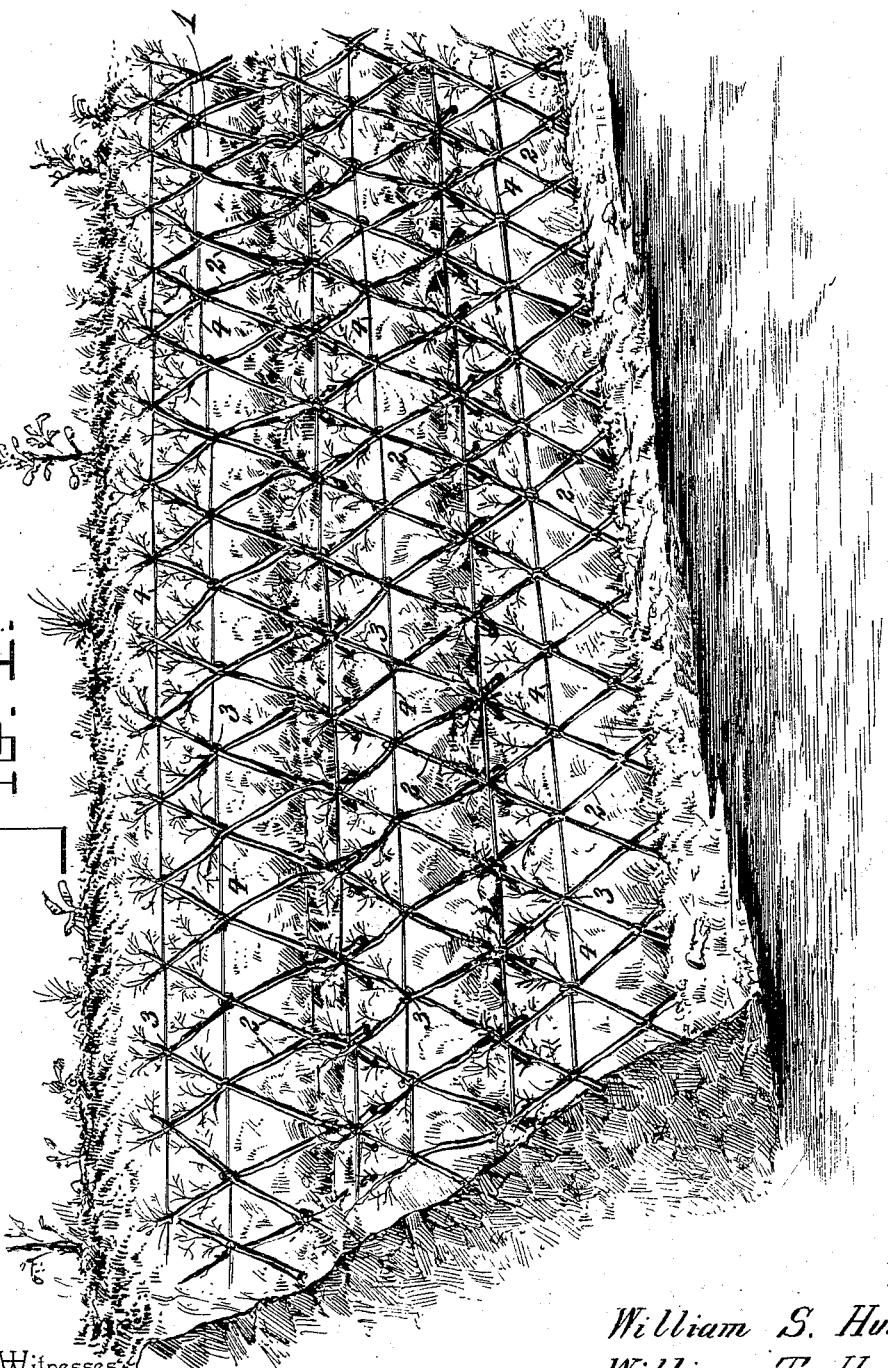

(No Model.) 2 Sheets—Sheet 1.

W. S. HUNLEY & W. T. HARRIS, Jr.
SYSTEM OF PROTECTING LEVEES.

No. 591,256. Patented Oct. 5, 1897.

Witnesses:
John F. Deuffenwiel
Edwin Cruse

Inventors
William S. Hunley.
William T. Harris Jr.
By their Attorneys,
C. A. Snow & Co.

(No Model.) 2 Sheets—Sheet 2.
W. S. HUNLEY & W. T. HARRIS, Jr.
SYSTEM OF PROTECTING LEVEES.
No. 591,256. Patented Oct. 5, 1897.
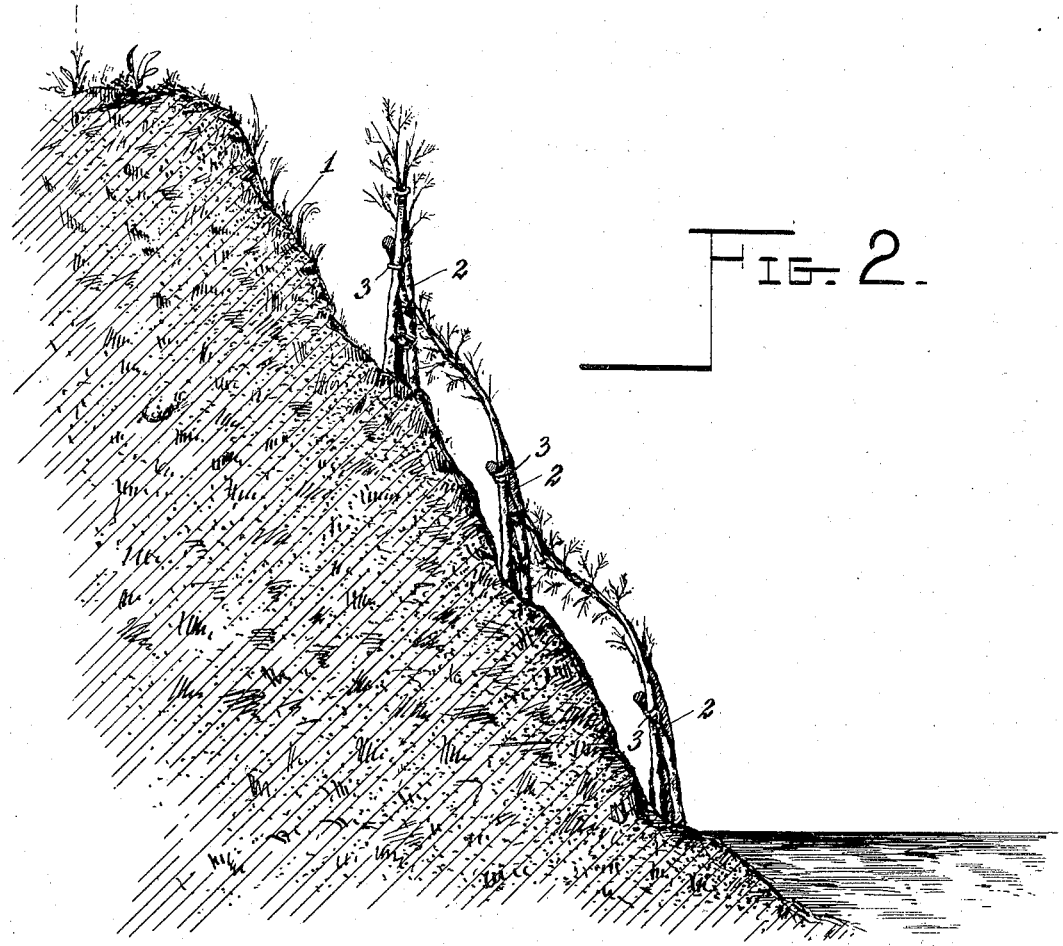
FIG. 2.
FIG. 3.
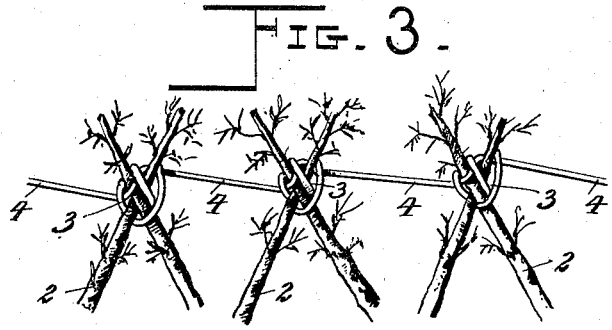
Witnesses
Inventors
William S. Hunley.
William T. Harris Jr
By their Attorneys,

UNITED STATES PATENT OFFICE.

WILLIAM STEELE HUNLEY AND WILLIAM TYLER HARRIS, JR., OF RICHMOND, KENTUCKY.

SYSTEM OF PROTECTING LEVEES.

SPECIFICATION forming part of Letters Patent No. 591,256, dated October 5, 1897.

Application filed June 25, 1897. Serial No. 642,305. (No model.)

*To all whom it may concern:*

Be it known that we, WILLIAM STEELE HUNLEY and WILLIAM TYLER HARRIS, Jr., citizens of the United States, residing at Richmond, in the county of Madison and State of Kentucky, have invented a new and useful System of Protecting Levees, of which the following is a specification.

This invention relates to an improved system of protecting levees from the detrimental action of the moving water and the heavy drift material carried by the water; and the invention consists in arranging a series of rows of plants one above the other on the inner face of the levee, the several plants in in each row crossing each other at an angle of about forty or forty-five degrees and being tied or connected together at the crossing-points by wire loops or ties and the upper portions of the plants in each row being secured to the plants in the row immediately above.

The invention will be fully described hereinafter, and particularly pointed out in the claim.

In the drawings, Figure 1 is a perspective view of a portion of a levee, showing our improved system of protection. Fig. 2 is a vertical transverse section. Fig. 3 is an enlarged detail view illustrating the preferred manner of connecting or tying the plants together.

Similar reference-numerals indicate similar parts in the several figures.

The inner face of the levee is indicated by 1 and the plants by 2. In the drawings we have shown three rows of plants arranged one above the other, and, as seen, the several plants in each row cross each other at an angle of about forty or forty-five degrees, and at the crossing-points the several plants are tied or connected together by wire loops or ties 3. The upper ends of the plants in the respective rows are also connected to the plants in the row immediately above. The preferred manner of connecting these loops to the plants is similar to that described in Letters Patent No. 428,754, granted May 27, 1890, to W. T. Harris, Jr. Briefly described, the loops or ties 3 are constructed by bending small pieces of wire around the plants at the crossing-points loosely and driving the ends of the wire into the plants. As the plants grow older and increase in size they will fill the loops or ties, and thereby be more firmly bound together. As an additional means of tying the plants together we employ wires 4, which extend transversely of the plants and are supported by the loops or ties, the wires 4 preferably passing in front of one plant and in the rear of the other at the crossing-points, thereby giving increased strength and firmness to the row of plants.

In order to better illustrate the manner of arranging the plants, we have shown them as they will appear when first planted, and it will be readily understood that as their age increases they will put out many small branches, which will become interlaced and eventually form a very thick and compact mass of shrubbery.

It is well known that one of the greatest sources of danger to levees is the constant washing away of the bank by the current of water, and the action of the water is frequently supplemented by heavy drift, which is driven against the bank and loosens considerable masses of dirt until in many places the bank becomes weakened to such an extent that it is unable to resist the pressure of the water against it.

By the arrangement of plants as described above they will by their natural growth gradually form a thick and compact mass of interwoven shrubbery over the inner face of the bank and thereby prevent the water from washing away the dirt. They will serve as a shield to prevent heavy drift, such as logs, from being driven forcibly against the dirt bank and thus prevent the making of holes in the bank, which by the constant action of the current of water would gradually become larger and perhaps eventually cause a break in the levee. The plants will also serve to arrest and hold much of the small drift, sediment, &c., carried by the water and thus gradually add to the bulk of the levee. The roots of the plants will also become interlaced in the dirt of the bank and thereby limit the tendency of the dirt to become loosened, and so add to the strength and durability of the levee.

The plants we propose to use in our system will be such as are commonly used to make hedge fences and best adapted to grow and thrive in the locality in which they will be planted. It is of course to be understood that as many rows of plants will be arranged one above another as may be necessary to carry the protection to a sufficient height to be serviceable under all conditions. It is apparent that by arranging the live plants in the manner described the protection to the levee will increase rather than diminish as the plants grow older, and that in the natural course of events the system will be constantly renewed, and that when once established it will require little expense to maintain it in proper condition.

Having described the invention, we claim—

The improved system of protecting levees consisting of setting out a series of rows of plants arranged one above the other on the inner face of the levee, crossing the plants and tying them together at the crossing-points, and connecting the upper portions of the plants in each row to the plants in the row immediately above it, substantially as and for the purpose described.

In testimony that we claim the foregoing as our own we have hereto affixed our signatures in the presence of two witnesses.

WILLIAM STEELE HUNLEY.
WILLIAM TYLER HARRIS, Jr.

Witnesses:
G. W. Evans, Jr.,
Jas. S. Crutcher.